United States Patent Office 3,360,534
Patented Dec. 26, 1967

3,360,534
METHOD OF PRODUCING A GUANYL-O-ALKYLISOUREA SALT
Keijiro Odo, Shibuya-ku, Tokyo, and Eiichi Ichikawa, Kohoku-ku, Yokohama, Japan, assignors to Nippon Carbide Kogyo Kabushiki Kaisha, Tokyo, Japan, a company of Japan
No Drawing. Filed Mar. 24, 1964, Ser. No. 354,459
Claims priority, application Japan, Apr. 1, 1963, 38/16,153
11 Claims. (Cl. 260—429.9)

ABSTRACT OF THE DISCLOSURE

A guanyl-O-alkylisourea acid addition salt is made by reacting dicyandiamide with a lower alcohol in the presence of a zinc salt to form a guanyl-O-alkylisourea zinc complex salt which is then hydrolyzed to precipitate the zinc as hydrate and allow it to be filtered off. These zinc complex salts are new as are the final acid addition salts. The dicyandiamide, alcohol and zinc salt initially reacted are in molar ratios of 2:2:1 or of 1:1:1, respectively.

---

This invention relates to a method for preparing guanyl-O-alkylisourea salts, and more particularly, it relates to a process for the production of the acid addition salt of guanyl-O-alkylisourea through a novel zinc complex salt of guanyl-O-alkylisourea.

Guanyl-O-alkylisourea is a well known compound which can be synthesized by the addition reaction of dicyandiamide with an alcohol and it is widely used as a biguanide-forming agent and as an intermediate compound in the synthesis of guanylurethanes. In actual practice the guanyl-O-alkylisourea has been prepared heretofore by conducting the aforesaid addition reaction in the presence of a copper salt to form a guanyl-O-alkylisourea copper complex salt and then splitting off copper from the said complex salt by the action of hydrogen sulfide. However, because of its high activity, guanyl-O-alkylisourea tends to hydrolyze or decompose under acidic or alkaline conditions, and therefore, the removal of copper has been required to be effected by suspending in water the copper complex salt which is difficultly soluble therein and then treating the resulted suspension, while stirring, with a large amount of hydrogen sulfide for a long period of time. The requirements of the prior method have been a great obstacle in the commercial production of guanyl-O-alkylisourea salts.

It has unexpectedly now been found that a guanyl-O-alkylisourea salt can be advantageously obtained by the addition reaction of dicyandiamide with a lower aliphatic alcohol with the addition of a zinc salt and the subsequent hydrolysis of the resulting guanyl-O-alkylisourea zinc complex salt. As the result of our extensive studies, we have now found that one or two moles of dicyandiamide can form with one or two moles of a lower aliphatic alcohol and one mole of a zinc salt, a guanyl-O-alkylisourea zinc complex salt which is readily hydroylsable to produce a guanyl-O-alkylisourea salt, said guanyl-O-alkylisourea zinc complex salt being represented by the Formula I or II shown later, depending on the molar ratio between the dicyandiamide, alcohol and zinc salt of 2:2:1 or 1:1:1. The reactions which can take place in a method of the present invention will be as follows:

Addition reaction of DD, ROH and Zn salt at the molar ratio of 2:2:1 and hydrolysis:

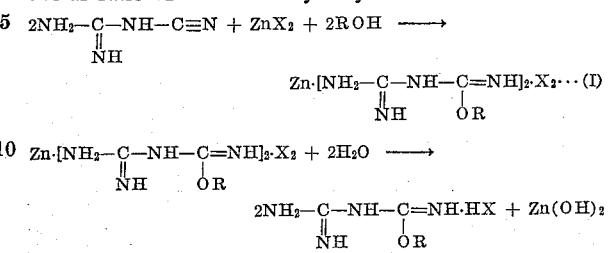

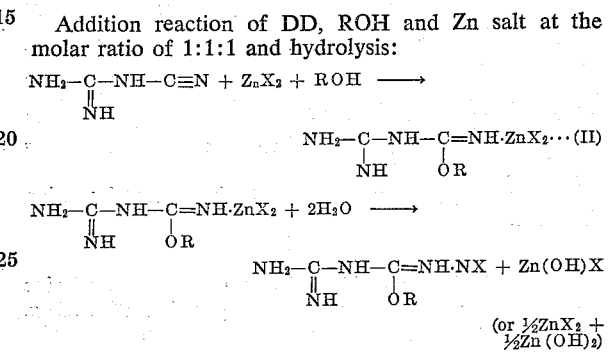

R = Lower alkyl
X = Anionic acid group ($NO_3$, $SO_4$, Cl, $CH_3COO$)

Thus, a method of the present invention is characterized by that the production of a guanyl-O-alkylisourea salt is carried out via a novel intermediate compound, a guanyl-O-alkylisourea zinc complex salt which can be assigned either of the above-indicated Formula I or II. Regardless of its chemical structure, a guanyl-O-alkylisourea zinc salt (I) or (II) can be hydrolyzed to guanyl-O-alkylisourea salt, and this fact is very surprising when the non-susceptibility of a guanyl-O-alkylisourea copper complex salt known in the art is considered. We have found that a guanyl-O-alkylisourea zinc complex salt of the Formula I is more readily hydrolyzable than that of the Formula II and so, in the most cases, it is recommendable to form a guanyl-O-alkylisourea zinc complex salt of the Formula I as an intermediate product. This is particularly true when a zinc salt is the salt of a strong acid, e.g. hydrochloric acid, because the zinc salt which is reformed after the hydrolysis of the intermediate guanyl-O-alkylisourea zinc complex salt of the Formula II inavoidably entrains in an aqueous phase so that troublesome operation may be required for separation of the entrained zinc salt from the resulting guanyl-O-alkylisourea salt. If the intermediate product to be hydrolyzed is essentially composed of a guanyl-O-alkylisourea zinc complex salt of the Formula I, the resultant system will be a fairly water-soluble guanyl-O-alkylisourea salt and a difficultly water-soluble zinc hydroxide, both of which can be easily separated by filtration. If the intermediate product of the first stage is essentially composed of a guanyl-O-alkylisourea zinc complex salt of the Formula II, prior to its hydrolysis the product may be pretreated with an alkali, e.g. alkali metal hydroxide, thereby to convert it into another form (i.e. the Formula I of the guanyl-O-alkylisourea zinc complex salt, which is preferred for hydrolysis in view of the technical point mentioned above.

The zinc salt which is referred to herein is the zinc salt of an inorganic or organic acid. Suitable zinc salts are zinc nitrate, zinc sulfate, zinc chloride, zinc acetate, etc. Other zinc salts, e.g. zinc bromide or zinc propionate, also are usable, but these are not preferred because of the economical reasons. The zinc salts can be used at an appropriate molar amount depending on the type of a guanyl-O-alkylisourea zinc complex salt intended as an intermediate product of the first stage. Usually, the molar amount of 0.5 mole or less of a zinc salt per mole of dicyandiamide is preferred because this allows us to have a guanyl-O-alkylisourea zinc complex salt of the Formula I. However, where zinc acetate is used, a higher amount of the zinc acetate than the specified amount is acceptable, because zinc acetate is less reactive with dicyandiamide and always form a product substantially composed of a guanyl-O-alkylisourea zinc complex salt of the Formula I.

The lower aliphatic alcohol used herein is methyl, ethyl, propyl, isopropyl or n-butyl alcohol. In practice, methyl and ethyl alcohols are preferred because of the economical and technical reasons. They can be preferably used in an amount sufficient to maintain the reactants in solution form, because they also serve as a reaction medium. In this case, the alcohol is used in an amount exceeding by five or more times the stoichiometric amount required to form a guanyl-O-alkylisourea zinc complex salt as intended.

The following examples illustrate the present invention in detail.

Example 1

42 g. of dicyandiamide (½ mol) and 48 g. of zinc nitrate (¼ mol) obtained by dehydration of 74.5 g. $Zn(NO_3)_2 \cdot 6H_2O$ were heated in 300 cc. of methanol with reflux for 4 hours. The reaction mixture was cooled and then filtered to recover a guanyl-O-methylisourea zinc complex salt; yield 93 g. Elementary analysis of the complex salt showed the following values:

Calcd. for $(C_3H_8N_4O)_2 \cdot Zn(NO_3)_2$: N, 33.2; Zn, 15.5. Found: N, 32.6; Zn, 15.9.

This result indicated that the said complex salt had the molar ratio between guanyl-O-methylisourea and zinc nitrate of 2:1, and the chemical structure of the complex salt can be considered to be as follows:

$$Zn \cdot [NH_2-\underset{\underset{NH}{\|}}{C}-NH-\underset{\underset{OCH_3}{|}}{C}=NH]_2 \cdot (NO_3)_2$$

To 50 g. of the complex salt, 250 cc. of water was added and the solution was agitated for about 40 minutes over a boiling water bath. The deposited zinc hydroxide was removed by filtration and the filtrate was concentrated to dryness under reduced pressure to deposit a guanyl-O-methylisourea nitrate, M.P. 97–99° C. This salt was recrystallized from isopropanol to obtain a pure product having a melting point of 102°–103° C.; yield 40.0 g. The total yield based on the consumed dicyandiamide was 90%. This compound did not show any depression in melting point when mixed with an authentic sample of the same material. Elementary analysis showed the following values:

Calcd. for $C_3H_8N_4O \cdot HNO_3$: N, 39.1. Found: N, 39.2.

Example 2

42. g. of dicyandiamide and 40 g. of zinc sulfate were heated in 100 cc. of methanol, with reflux, for 2 hours. The reaction mixture was first formed into a gelatinous state and then gradually solidified. The reaction product was pulverized and then washed with hot methanol to form 100.5 g. of a guanyl-O-methylisourea zinc complex salt. Elementary analysis of the complex salt showed the following values:

Calcd. for $(C_3H_8N_4O)_2ZnSO_4$: N, 28.5; Zn, 16.6. Found: N, 28.1; Zn, 16.2.

This result indicated that the said complex salt had the molar ratio of guanyl-O-methylisourea to zinc sulfate of 2:1, and the chemical structure of the complex salt can be considered to be as follows:

$$Zn \cdot [NH_2-\underset{\underset{NH}{\|}}{C}-NH-\underset{\underset{OCH_3}{|}}{C}=NH]_2 \cdot SO_4$$

50 g. of the complex salt was treated in the same manner as in Example 1 to obtain 36 g. of a guanyl-O-methylisourea sulfate dihydrate. This salt was recrystallized from an ethanol-methanol solvent to obtain a pure product having a melting point of 142–144° C. The total yield based on the consumed dicyandiamide was 91%.

Calcd. for $(C_3H_8N_4O)_2 \cdot H_2SO_4 \cdot 2H_2O$: N, 30.6. Found: N, 30.9.

Example 3

46.2 g. of dicyandiamide and 34 g. of zinc chloride were heated with reflux in 300 cc. of methanol for 6 hours, and the deposited guanyl-O-methylisourea zinc complex salt was filtered and separated; yield 45 g. 20.0 g. of the complex salt was treated in the same manner as in Example 1 to obtain 15 g. of guanyl-O-methylisourea hydrochloride M.P. 157° C. The total yield based on the consumed dicyandiamide was 65%. Elementary analysis of this product was found to be as follows:

Calcd. for $C_3H_8N_4O \cdot HCl$: N, 36.6. Found: N, 36.3.

Example 4

42 g. of dicyandiamide (½ mol) and 68.4 g. of zinc chloride (½ mol) were heated with reflux in 250 cc. of methanol for 4 hours. The resulting reaction mixture was filtered and dried. 116 g. of the guanyl-O-methylisourea zinc complex salt was obtained which had the molar ratio between guanyl-O-methylisourea and zinc chloride of 1:1 and could be assigned the following chemical structure:

$$Zn \cdot [NH_2-\underset{\underset{NH}{\|}}{C}-NH-\underset{\underset{OCH_3}{|}}{C}=NH] \cdot Cl_2$$

Elementary analysis showed the following values:

Calcd. for $C_3H_8N_4O \cdot ZnCl_2$: N, 22.2; Zn, 25.9. Found: N, 22.4; Zn, 25.7.

The complex salt thus obtained (110 g.) was suspended into methanol and then added with 14.6 g. of potassium hydroxide. The resulting mixture was heated at its refluxing point for two hours. After cooling, the reaction mixture was filtered to give 127.5 g. of the solid product. This was composed of a guanyl-O-methylisourea zinc complex salt with the molar ratio of 2:1 (GOMe:ZnCl₂), zinc hydroxide and potassium chloride.

The solid product (50 g.) can be subjected to hydrolysis in the same manner as in Example 1, thereby to obtain crude crystalline guanyl-O-methylisourea hydrochloride. It was recrystallized from methanol to obtain a pure product, M.P. 157°–158° C.; yield 22 g. The total yield based on the consumed dicyandiamide was 80%. Elementary analysis of this product was found to be as follows:

Calcd. for $C_3H_8N_4O \cdot HCl$: N, 36.6. Found: N, 36.4.

Example 5

21 g. of dicyandiamide (¼ mol), 36.8 g. of zinc acetate (⅕ mol) and 40 cc. of methanol were heated with refluxing for 3 hours. After cooling the reaction mixture, the deposited guanyl-O-methylisourea zinc complex salt was filtered and separated; yield 42 g. 25 g. of the complex salt was treated in the same measure as in Example 1 to form 12.5 g. of guanyl-O-methylisourea acetate, M.P. 100°–102° C. This salt was recrystallized to obtain a pure product having a melting point of 106°–107° C.

Example 6

42 g. of dicyandiamide (½ mol) and 34 g. of zinc chloride (¼ mol) were heated with reflux in 100 cc. of ethanol for 4 hours to form 75 g. of a guanyl-O-ethylisourea zinc complex salt. 50 g. of the complex salt was treated in the same manners as in Example 1 to obtain guanyl-O-ethylisourea hydrochloride, M.P. 166°–167° C.; yield 34 g. The total yield based on the reacted dicyandiamide was 74%. Elementary analysis was found to be as follows:

Calcd. for C$_4$H$_{10}$N$_4$O·HCl: N, 33.6. Found: N, 33.8.

What we claim is:

1. A method of producing a guanyl-O-alkylisourea salt which comprises reacting dicyandiamide with a lower aliphatic alcohol and a zinc salt selected from the group consisting of zinc nitrate, sulfate, bromide, chloride, acetate an propionate, to form a guanyl-O-alkylisourea zinc complex salt and then subjecting the said complex salt to hydrolysis to form a guanyl-O-alkylisourea salt.

2. A method of producing a guanyl-O-alkylisourea salt which comprises reacting dicyandiamide with a lower aliphatic alcohol having one to two carbon atoms and a zinc salt selected from the group consisting of zinc nitrate, zinc sulfate, zinc chloride and zinc acetate, at the molar ratio therebetween of at least 2:2:1, thereby to form a guanyl-O-alkylisourea zinc complex salt of the formula

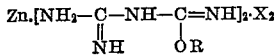

wherein R is a lower alkyl radical selected from the group consisting of nitrate, sulfate, bromide, chloride, acetate and propionate ions and X is an acid radical, and then subjecting the said complex salt to hydrolysis to form a guanyl-O-alkylisourea acid addition salt and zinc hydrate and then separating the zinc hydrate from the mixture.

3. A method of producing a guanyl-O-alkylisourea salt, which comprises reacting dicyandiamide with a lower aliphatic alcohol having one to two carbon atoms and a zinc salt selected from the group consisting of zinc nitrate, zinc sulfate, zinc chloride and zinc acetate, at the molar proportion therebetween of approximately 1:1:1, thereby to form a guanyl-O-alkylisourea zinc complex salt of the formula

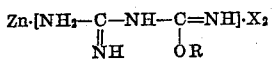

wherein R is a lower alkyl radical and X is an acid radical, treating said complex salt with an alkali to convert it into a guanyl-O-alkylisourea zinc complex salt of the formula

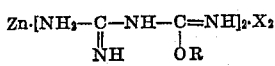

wherein R and X are the same as defined above, and then subjecting the complex salt just above to hydrolysis to form a guanyl-O-alkylisourea acid addition salt and zinc hydrate and removing the latter by filtration.

4. Guanyl-O-alkylisourea zinc complex salt of the formula

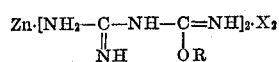

wherein R represents a lower alkyl radical and X represents an acid radical selected from the group consisting of nitrate, sulfate, chloride, bromide, propionate and acetate anions.

5. Guanyl-O-methylisourea zinc complex salt of the formula

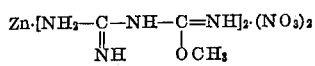

6. Guanyl-O-methylisourea zinc complex salt of the formula

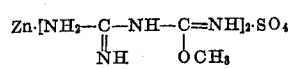

7. Guanyl-O-methylisourea zinc complex salt of the formula

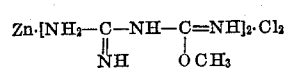

8. Guanyl-O-methylisourea zinc complex salt of the formula

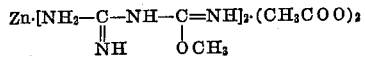

9. Guanyl-O-ethylisourea zinc complex salt of the formula

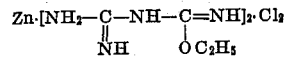

10. Guanyl-O-alkylisourea zinc complex salt of the formula

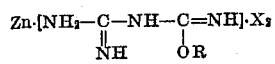

wherein R represents a lower alkyl radical and X represents an acid radical selected from the group consisting of nitrate, sulfate, bromide, chloride, propionate and acetate anions.

11. Guanyl-O-methylisourea zinc complex salt of the formula

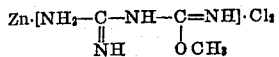

References Cited

UNITED STATES PATENTS 2,502,897   4/1950   Smith _____ 260—429.9

OTHER REFERENCES

Chemical Abstracts, vol. 62, page 9003e (1965).
Chemical Abstracts, vol. 58, page 12885 (1963).
Moeller, Inorganic Chemistry, John Wiley & Sons, Inc., New York (1954), pages 235 and 236.

TOBIAS E. LEVOW, *Primary Examiner.*

H. M. S. SNEED, *Assistant Examiner.*